(12) United States Patent
Aihara et al.

(10) Patent No.: US 8,794,893 B2
(45) Date of Patent: Aug. 5, 2014

(54) FASTENING PIN AND MANUFACTURING METHOD THEREOF

(75) Inventors: Yasunori Aihara, Tokyo (JP); Toshimichi Arai, Tokyo (JP)

(73) Assignee: Max Co., Ltd., Tokyo (JP)

( * ) Notice: Subject to any disclaimer, the term of this patent is extended or adjusted under 35 U.S.C. 154(b) by 290 days.

(21) Appl. No.: 13/363,461

(22) Filed: Feb. 1, 2012

(65) Prior Publication Data

US 2012/0219382 A1   Aug. 30, 2012

(30) Foreign Application Priority Data

Feb. 24, 2011   (JP) .................................. 2011-038653

(51) Int. Cl.
*F16B 15/00*   (2006.01)

(52) U.S. Cl.
USPC .......................................... 411/487; 411/440

(58) Field of Classification Search
USPC .............. 411/446, 487, 451.4, 490, 498, 922, 411/923, 440
See application file for complete search history.

(56) References Cited

U.S. PATENT DOCUMENTS

| | | | | |
|---|---|---|---|---|
| 2,650,032 A | * | 8/1953 | Godfrey | 238/375 |
| 3,478,638 A | * | 11/1969 | Thurner | 411/441 |
| 3,921,495 A | * | 11/1975 | Braun et al. | 411/441 |
| 4,915,561 A | * | 4/1990 | Buhri et al. | 411/439 |
| 5,181,886 A | | 1/1993 | Van Allman et al. | |
| 5,391,029 A | * | 2/1995 | Fardell | 411/452 |
| 5,443,345 A | * | 8/1995 | Gupta | 411/441 |
| 6,171,042 B1 | | 1/2001 | Olvera et al. | |
| 8,449,237 B2 | * | 5/2013 | Armiento et al. | 411/487 |
| 8,616,817 B2 | * | 12/2013 | Siemers | 411/453 |

FOREIGN PATENT DOCUMENTS

| | | |
|---|---|---|
| DE | 2423410 A1 | 5/1974 |
| EP | 2 085 624 | 8/2009 |
| JP | 9-151918 A | 10/1997 |
| JP | 11-257315 | 9/1999 |
| JP | 2002-81424 | 3/2002 |
| JP | 2008-51153 | 3/2008 |
| JP | 2008-115995 | 5/2008 |

* cited by examiner

*Primary Examiner* — Gary Estremsky
(74) *Attorney, Agent, or Firm* — Drinker Biddle & Reath LLP

(57) ABSTRACT

A fastening pin has an enlarged head part, and a shaft part. The shaft part includes a large diameter section formed below the enlarged head part, a middle shaft section formed below the large diameter section, and a small diameter section extending from the middle shaft section to a leading end of the fastening pin. The large diameter section includes a round portion formed below the enlarged head part and a taper portion formed between the round portion and the middle shaft section. A diameter of the large diameter section at a side of the enlarged head part is larger than a diameter of the large diameter section at a side of the middle shaft section. The middle shaft section has a uniform diameter from a side of the large diameter section to a side of the small diameter section.

7 Claims, 4 Drawing Sheets

FASTENING PIN AND MANUFACTURING METHOD THEREOF

BACKGROUND OF THE INVENTION

1. <Field of the Invention>

The present invention relates to a fastening pin for a rigid member to be driven and a manufacturing method thereof. More specifically, the present invention relates to a fastening pin capable of fastening a thin steel sheet such as a bracket or a plate into the rigid member such as a concrete or a metal steel.

2. <Related Art>

In a construction such as a building or in a civil engineering construction such as a bridge or a tunnel, a fastening member is driven by a tool using a driving source such as a compressed air, a combustion gas or a gunpowder, in order to fasten a thin steel sheet such as a bracket or a plate into a rigid member such as a concrete or a metal steel.

Patent Documents 1 to 3 disclose, as the fastening member, a concrete pin in which a head side of a shaft part is formed to have a large diameter and a leading end side thereof is formed to have a small diameter.

Patent Document 1: EP2085624
Patent Document 1: U.S. Pat. No. 6,171,042
Patent Document 1: JP-A-2008-051153

However, since a rigid concrete is utilized in a high strength construction and the conventional concrete pin is provided at its middle part with a large step or a taper angle of its head part side is set too large, a driving resistance increases and thus a portion below the head part is liable to be flexed. As a result, a poor driving is frequently occurred. Further, in the recent, strength of the construction is gradually increased, a rebuilding construction of a concrete building tends to be increased, and the strength of the concrete is increased due to material age thereof. Accordingly, a pin which can be driven into more rigid member is strongly demanded. Of course, when a pin is driven into a rigid member having strength over substantially 60 N/mm$^2$, a tool with sufficient power is necessary. In this case, from the viewpoint of workability due to a size of a driving tool itself, it is necessary to reduce a penetration resistance for the rigid member when being driven and to retain the fastening force (retaining force of the pin) for the rigid member after being driven.

When the concrete pin is driven into the rigid member, the pin is driven and penetrated substantially perpendicular to the rigid member. However, since the rigid member is used as a member to be driven, the shaft part and the under-head part directly below the head part are required for high strength. If the strength is insufficient, the shaft part is liable to be flexed or the under-head part is liable to be bent, thereby hindering a fastening operation. If a pin with a step is to be employed for corresponding to very rigid concrete such as ultra high strength concrete which is recently developed and practically used, it is necessary to increase a shaft diameter to improve the strength. As a result, the penetration resistance is increased and thus a tool with sufficient power is necessary.

Further, it is not easy to manufacture a concrete pin in which entire shaft part is formed in a taper shape or the under-head part is formed in a rounded shape. Also, a pin having a large shaft diameter can afford a high strength but this pin is expensive. When a fastening pin having a large shaft diameter is used in order to afford high strength, an outer diameter of a metal rod member used as a material also becomes large. Accordingly, there is a problem that the manufacturing cost becomes expensive.

SUMMARY OF THE INVENTION

One or more embodiments of the invention relate to a fastening pin capable of being effectively driven into a rigid member to be driven without being flexed when being driven.

In addition, one or more embodiments of the invention relate to a manufacturing method of the fastening pin capable of increasing a diameter of the fastening pin over a diameter of a metal rod member used as a material even without increasing the diameter of the metal rod member.

DETAILED DESCRIPTION OF THE EMBODIMENTS

Figure 1:
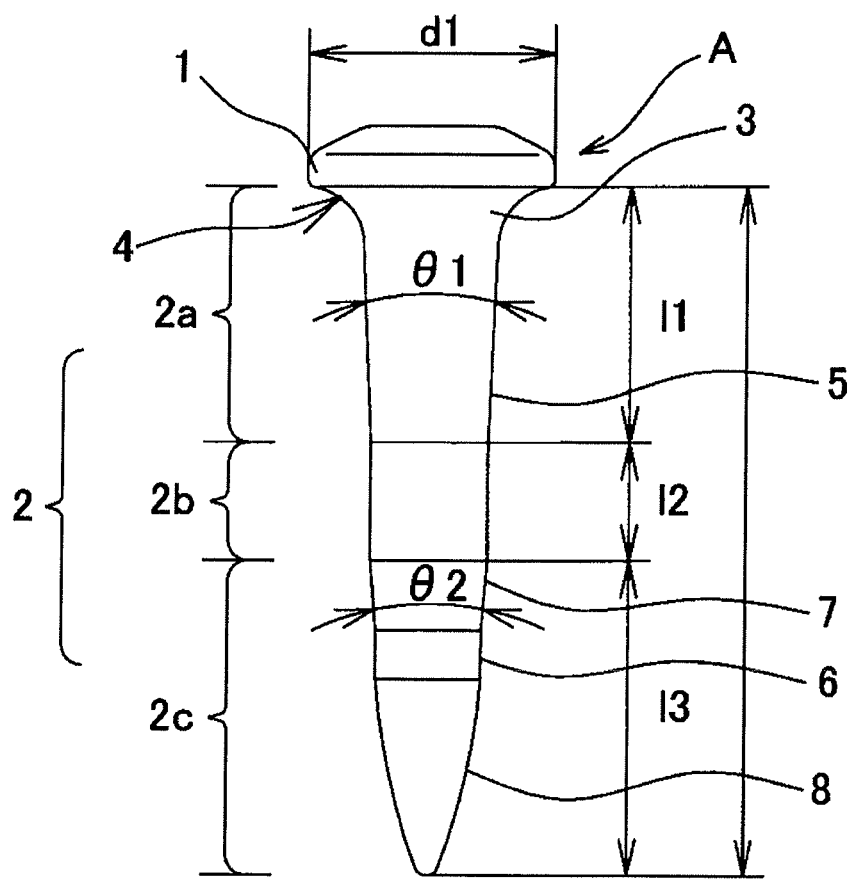
FIG. 1 is a front view illustrating a concrete pin according to an embodiment.

Hereinafter, embodiments of the invention will be described with reference to the drawings. The embodiments described herein are not intended to limit the invention but only to exemplify the invention, and all features or combinations of the features of the embodiments are not always essential to the invention.

In FIGS. 1 to 5, reference numeral A refers to a concrete pin. The concrete pin A is an example of a fastening pin and is used to fasten a thin iron plate into a rigid concrete having strength over 60 N/mm$^2$, for example. The concrete pin includes an enlarged head part 1 and a shaft part 2. The shaft part 2 is constituted by a large diameter section 2a below the enlarged head part 1, a middle shaft section 2b below the large diameter section 2a and a small diameter section 2c extending from the middle shaft section 2b to a bullet-shaped leading end thereof. The "bullet shape" is a shape such that a diameter of the shape gradually decreases toward a leading end at which the diameter is zero and a decrease ratio of the diameter gradually increases toward the leading end. Herein, an example of the size of the concrete pin A is dimensioned as follows. Entire length thereof is 19 mm, a diameter d of the enlarged head part 1 is 6.25 mm, an axial length (length from an under-head part to a leading end of the fastening pin) 1 of the shaft part 2 is 17.5 mm, a length 11 of the large diameter section 2a is 6.5 mm, a length 12 of the middle shaft section 2b is 3.0 mm, a length 13 of the small diameter section 2c is 8.5 mm, and a diameter d1 of the middle shaft section 2b is 2.96 mm.

An under-head part 3 is provided below the enlarged head part 1 and provided at its outer surface with a round portion (curved portion) 4. The round portion 4 is set so large that the under-head part 3 is not to be flexed when the fastening pin is driven into the rigid member. In a case of the concrete pin A having the dimensions mentioned in the above, the round portion 4 of the under-head part 3 may be set with substantially R 1.5.

Next, the large diameter section 2a has a length greater than ⅓ of the axial length of the shaft part. The large diameter section 2a includes a taper portion 5 formed between the round portion 4 and the middle shaft section 2b so that the diameter of the under-head part 3 is larger than that of the middle shaft section. The taper portion 5 connects the round portion 4 of the under-head part 3 and the middle shaft section 2b and is adapted to cause a penetration resistance for the rigid member to be reduced and keep a pullout resistance after the fastening pin is driven into the rigid member. And, the taper portion is configured so that the large diameter section 2a is not to be flexed when the fastening pin is driven into the rigid member. In this case, it is preferred that the taper portion 5 is tapered at an angle θ1 of 2 to 5 degree.

Herein, the middle shaft section 2b is a straight portion having uniform diameter.

Next, the small diameter section 2c is formed by a lower middle shaft portion 6 having a diameter smaller than that of the middle shaft section 2b, a lower taper portion 7 provided between the lower middle shaft portion 6 and the middle shaft section 2b, and a leading end portion 8 provided below the lower middle shaft portion 6. The lower taper portion 7 is tapered, for example, at an angle θ2 of 10 degree. The length of the leading end portion 8 is, for example, 5 mm and formed in a bullet shape.

In the above configuration, since the round portion 4 of the under-head part 3 of the concrete pin A is set to have a considerably large value of substantially R 1.5, the strength of the under-head part 3 and the large diameter section 2a is large, and a stress concentration on the under-head part 3 is alleviated and thus a bending strength of the under-head part 3 is improved. Further, when an operator hits the enlarged head part 1 while the fastening pin is driven into the rigid member, the enlarged head part 1 is not easily flexed.

Further, the large diameter section 2a has a length greater than ⅓ of the axial length of the shaft part and the large diameter section 2a includes a taper portion 5 with a taper angle of 2 to 5 degree formed between the under-head part 3 and the middle shaft section 2b so that the diameter of the under-head part 3 is larger than that of the middle shaft section. Accordingly, the strength of the under-head part 3 and the large diameter section 2a is increased, and a stress concentration on the large diameter section 2a is alleviated and thus a bending strength of the large diameter section 2a is improved. Further, when an operator hits the large diameter section 2a while the fastening pin is driven into the rigid concrete, the large diameter section 2a is not easily flexed.

Herein, when the taper angle θ1 of the taper portion 5 is smaller than 2 degree, a diameter in an upper area of the concrete pin A is not sufficiently large and a desired strength (bending strength) is not achieved. On the contrary, when the taper angle θ1 is larger than 5 degree, a penetration resistance is increased when the fastening pin is driven into the rigid member and a desired pullout resistance (retaining force) cannot be obtained after the fastening pin is driven into the rigid member. In addition, the taper angle is limited to 5 degree from the viewpoint of production technique (which will be described later).

Since the middle shaft section 2b is a straight portion having uniform diameter, a penetration resistance is not increased when the fastening pin is driven into the rigid member and a large pullout resistance can be obtained after the fastening pin is driven into the rigid member.

Further, the small diameter section 2c is formed by the lower middle shaft portion 6 having uniform diameter smaller than that of the middle shaft section 2b, the lower taper portion 7 provided between the lower middle shaft portion 6 and the middle shaft section 2b, and the leading end portion 8 provided below the lower middle shaft portion 6. Since the leading end portion 8 is formed in a bullet shape, a penetration resistance is reduced. Further, since the lower middle shaft portion 6 has uniform diameter, the penetration resistance is reduced and the pullout resistance is improved. In addition, since a diameter of the lower taper portion 7 provided between the lower middle shaft portion 6 and the middle shaft section 2b is gradually increased, it is possible to increase the strength of a region from an upper portion of the pin to the middle shaft section 2b. Herein, the reason for forming the lower middle shaft portion 6 to have uniform diameter is to achieve a desired pullout resistance after being driven. Further, the reason for setting the taper angle of the lower taper portion 7 in 10 degree is to reduce a diameter of the small diameter section 2c and thus to reduce penetration resistance into the concrete member.

As mentioned in the above, the under-head part 3 is formed with the round portion 5 and the large diameter section 2a includes a taper portion 5 formed between the round portion 4 and the middle shaft section 2b so that the diameter of the under-head part 3 is larger than that of the middle shaft section. Accordingly, the strength of the under-head part 3 and the large diameter section 2a is large, and a stress concentration on the large diameter section 2a or the under-head part 3 is alleviated and thus a bending strength of the large diameter section 2a or the under-head part 3 is improved. Further, when an operator hits the enlarged head part 1 while being driven into the rigid member, the enlarged head part 1 or the large diameter section 2a is not easily flexed.

Since the middle shaft section 2b is a straight portion having uniform diameter, a penetration resistance is not increased when the fastening pin is driven into the rigid member and a large pullout resistance can be obtained after the fastening pin is driven into the rigid member.

Figure 2:
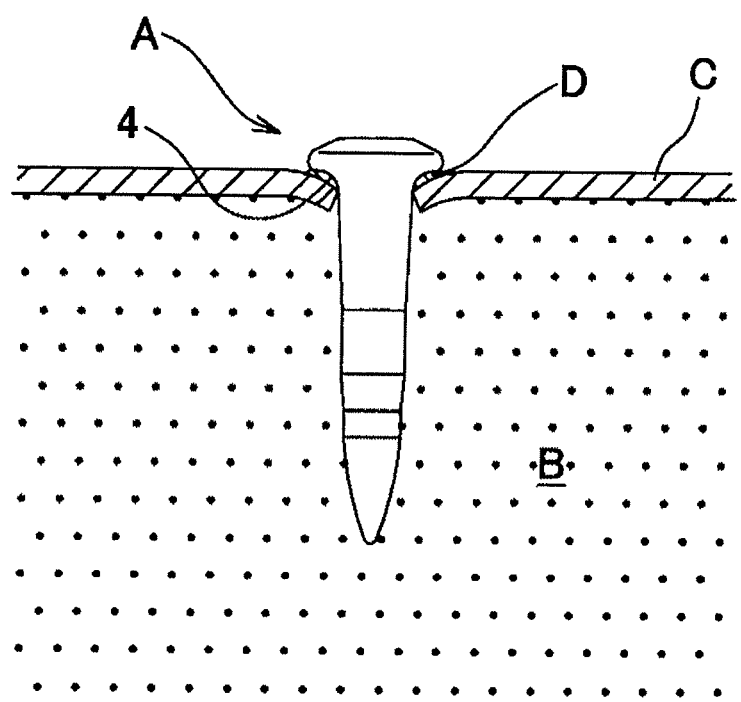
FIG. 2 is a perspective view illustrating the concrete pin in a state where being driven into a rigid concrete.

By the above configurations, as illustrated in FIG. 2, it is possible to securely fix a thin iron sheet C to the rigid concrete B by the concrete pin A. Herein, since the thin iron sheet C is relatively soft, the round portion 4 of the under-head part can be penetrated through the thin iron sheet. In addition, although not illustrated, the concrete pin A can be constituted as a connecting pin formed by connecting a plurality of pins using synthetic resin coupling material. In this case, when being driven into the rigid member, the concrete pin A is driven together with the coupling material divided from the other concrete pins. In this way, the round portion 4 is penetrated through the thin metal sheet and the coupling material D and thus the penetration resistance of the round portion 4 is increased. Accordingly, the round portion cannot penetrate through the concrete and thus a poor driving is not occurred.

Figure 3:
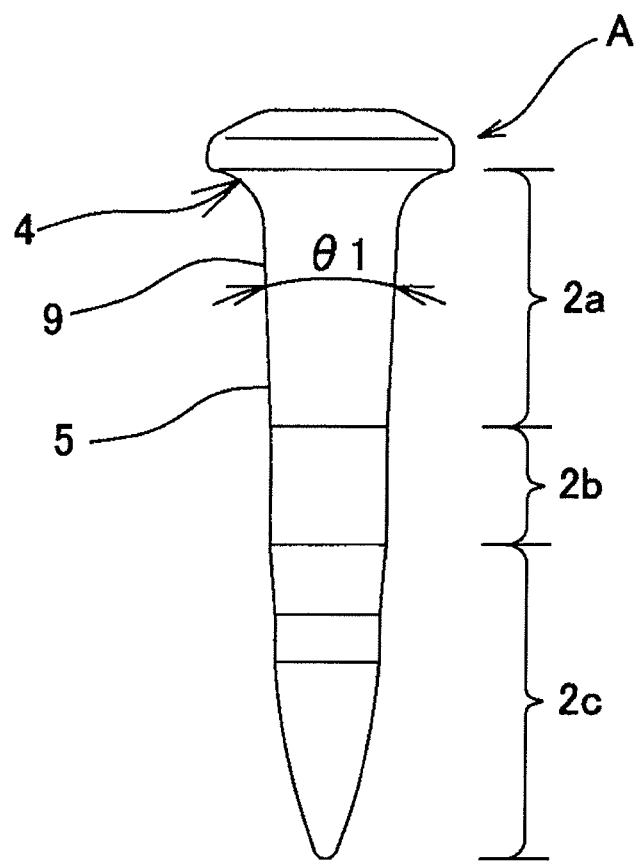
FIG. 3 is a perspective view illustrating a concrete pin according to another embodiment.

The concrete pin A is not limited to the above embodiment. For example, as illustrated in FIG. 3, the large diameter section 2a may be formed in two stages. That is, the taper portion 5 constitutes a lower part of the large diameter section and a straight portion 9 with uniform diameter constitutes an upper part thereof. In this case, the large diameter section 2a can secure a bending strength by the taper portion 5 and a retaining force after being driven can be maintained in a high level by the straight potion 9.

Further, the middle shaft section 2b can be made longer and directly connected to the bullet-shaped small diameter section 2c.

Figures 4A, 4B, 4C:
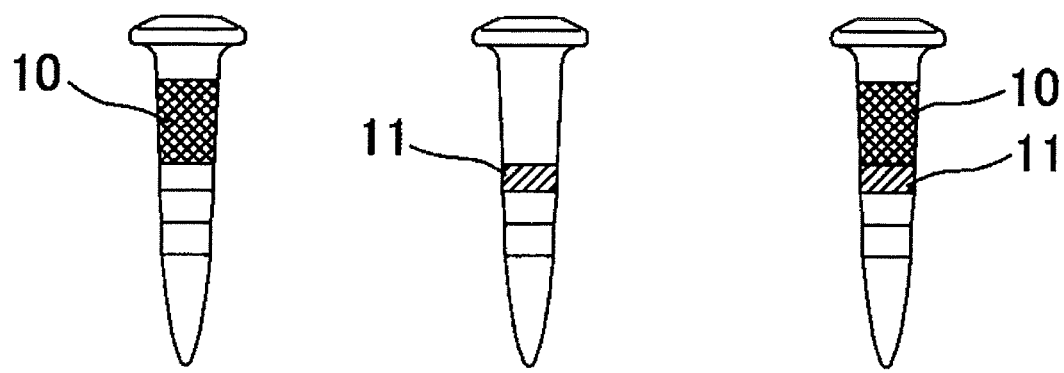
FIGS. 4(a) to 4(c) are front views illustrating the concrete pins which are formed at its surface with grooves.

Further, in the respective embodiments, as illustrated in FIGS. 4(a) to 4(c), in order to increase the retaining force after being driven, knurling grooves 10 or oblique parallel grooves 11 may be formed on the surface of the shaft part. The same is applicable to the concrete pin illustrated in FIG. 3.

Figure 5A:
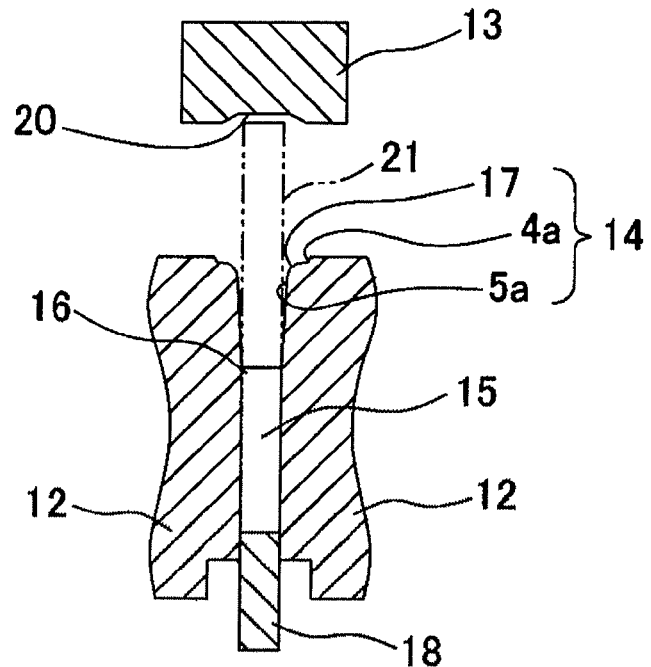
FIGS. 5(a) and 5(b) are views explaining a manufacturing method for forming an enlarged head part and a large diameter section of the concrete pin.

Herein, the large diameter section 2a in an upper part of the concrete pin A has a diameter larger than an outer diameter of the metal rod member (carbon steel wire) as a material of the concrete pin A by the taper portion 5. The taper portion thus configured can be processed and formed by two left and right dies 12 and a header punch 13, as illustrated in FIG. 5(a).

That is, a space 16 consisting of an upper space 14 and a lower space 15 is provided between matching surfaces of the two left and right dies 12. The upper space 14 has an inner diameter larger than an outer diameter of a rod member 21 and is formed with a taper portion 5a and a round portion 4a so that the upper space has a width larger than the lower space. Further, the upper space is provided at its upper end with a circular concave portion 17. The lower space 15 has an inner diameter substantially equal to the outer diameter of the rod member 21. Herein, the upper end of the upper space 14 is open and a lower end of the lower space 15 is closed. In this case, although a lower die 18 can be fixedly provided on a lower side portion of the matching surface of the pair of dies 12 as illustrated in FIG. 4, it is also possible that the lower die 18 is provided on one or both of the two left and right dies 12 and closes the space 16 when the pair of dies 12 are mated to each other. The header punch 13 is arranged over the matching surface of the pair of dies 12 to move in a vertical direction. The header punch 13 is provided at its lower surface with a circular concave portion 20 corresponding to the enlarged head part 1 of the concrete pin A. Thereby, a space for the head part is formed between the circular concave portion 17 of the upper end in the matching surface of the dies 12 and the lower surface of the header punch 13 so as to correspond to the outer shape of the enlarged head part 1.

Figure 5B:
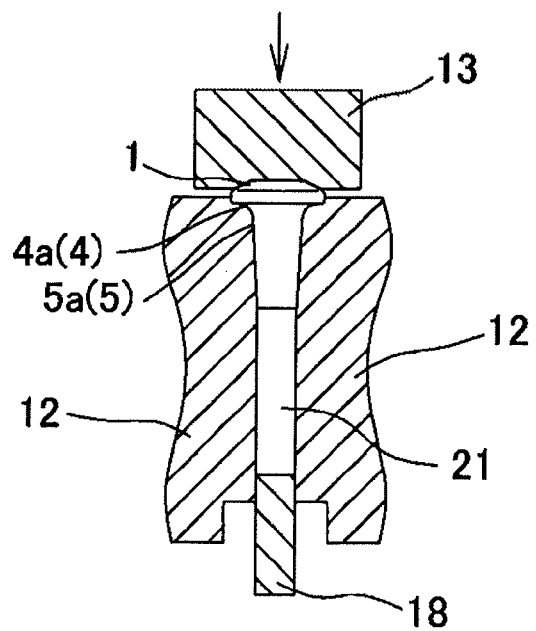

When the taper portion 5 in the upper part of the concrete pin A is formed by the dies thus configured, first, a metal rod member 21 (carbon steel wire) having a diameter equal to the diameter of the middle shaft section 2b is provided inside the space 16 of the pair of dies 12. At this time, an upper end of the rod member 21 is projected upward from the dies 12. And then, the pair of dies 12 are mated to each other to fix the rod member 21. Next, as illustrated in FIG. 5(b), the header punch 13 is lowered to urge and crush the projected portion of the rod member. Thereby, the enlarged head part 1 is formed between the lower surface of the header punch 13 and the circular concave portion 17 of the dies 12. Simultaneously, when the upper part of the rod member 21 is crushed, the rod member 21 is fixed inside of the space 16. At this time, since the upper space 14 has a diameter larger than the outer diameter of the rod member 21, a portion of the upper part of the rod member 21 is projected to correspond to the inner shape of the upper part of the space, thereby filling the round portion 4a and the taper portion 5a. In this way, the round portion 4 and the taper portion 5 are formed.

According to the manufacturing method for forming the taper portion mentioned in the above, the taper portion 5 having a diameter larger than the diameter of the rod member 21 can be rapidly and economically formed in the fastening pin without a specific processing.

When knurling grooves or oblique parallel grooves are formed on the surface of the concrete pin A, a concave and convex part may be formed in the space of the dies to correspond to each of the grooves.

As mentioned in the above, by driving and crushing the projected portion of the rod member 21 using the header punch 13, the upper part of the rod member 21 is projected along the matching surface of the middle shaft section 2b to form the taper portion 5. However, in this manufacturing method, the taper angle of the taper portion 5 is limited within 5 degree.

Herein, after the rod member 21 is processed as mentioned in the above, the small diameter section 2c of the lower part of the rod member 21 can be processed in a conventional way.

As mentioned in the above, the large diameter section 2a of the concrete pin A has a diameter larger than an outer diameter of the metal rod member 21 used as a material by the taper portion 5. However, since the taper portion 5 is formed by axially urging and crushing the upper part of the metal rod member 21 using the header punch 13 to cause the upper part to be projected outward, it is not necessary to use the metal rod member 21 having a diameter equal to a diameter of the upper end of the taper portion 5. Accordingly, it is possible to simplify the manufacturing process and to reduce a manufacturing cost thereof.

Although the above embodiments are directed to the concrete pin, the present invention is not limited to the concrete pin. For example, the present invention is also applicable to a fastening pin which can be driven into another rigid member.

In accordance with the above embodiments, a fastening pin (A) to be driven into a rigid member may include an enlarged head part 1; and a shaft part 2. The shaft part 2 may include: a large diameter section 2a formed below the enlarged head part 1; a middle shaft section 2b formed below the large diameter section 2a; and a small diameter section 2c extending from the middle shaft section 2b to a leading end of the fastening pin A. The large diameter section 2a may include a round portion 4 formed below the enlarged head part 1 and a taper portion 5 formed between the round portion 4 and the middle shaft section 2b, and a diameter of the large diameter section 2a at a side of the enlarged head part 2a may be larger than a diameter of the large diameter section 2a at a side pf the middle shaft section 2b. The middle shaft section 2b has a uniform diameter from a side of the large diameter section 2a to a side of the small diameter section 2c. A side of a leading end of the small diameter section 2c may have a bullet shape.

In the above structure, a lower end of the large diameter section 2a may be in contact with an upper end of the middle shaft portion 2b, and the lower end of the large diameter section 2a may have the same diameter with a diameter of the upper end of the middle shaft portion 2b. A lower end of the middle shaft section 2b may be in contact with an upper end of the small diameter section 2c, and the lower end of the middle shaft section 2b may have the same diameter with a diameter of the upper end of the small diameter section 2c. A lower end of the round portion 4 may be in contact with an upper end of the taper portion 5, and the lower end of the round portion 4 may have the same diameter with a diameter of the upper end of the taper portion 5.

According to this structure, the large diameter section is constituted by a round portion below the enlarged head part and a taper portion formed between the round portion and the middle shaft section so that the diameter of the enlarged head part is larger than that of the large diameter section. Accordingly, the strength of the under-head part directly below the enlarged head part and the large diameter section is large, and a stress concentration on the large diameter section or the under-head part is alleviated and thus a bending strength of the large diameter section or the under-head part is improved. Further, when an operator hits the enlarged head part while being driven into the rigid member, the enlarged head part or the large diameter section is not easily flexed.

Further, since the middle shaft section is a straight portion having uniform diameter, the penetration resistance is not increased when the fastening pin is driven into the rigid member and a large pullout resistance can be obtained after the fastening pin is driven into the rigid member.

In the above structure, a length l1 of the large diameter section 2a may be the same as or greater than ⅓ of an axial length l of the shaft part 2. A taper angle θ1 of the taper portion 5 maybe set to an extent so as to reduce a penetration resistance against the rigid member and to keep a pullout resistance after the fastening pin is driven into the rigid member and such that the large diameter section 2a is not to be flexed when the fastening pin is driven into the rigid member.

According to this structure, the large diameter section has a length greater than ⅓ of the axial length of the shaft part, the taper portion connects the round portion and the middle shaft section, is adapted to reduce the penetration resistance for the rigid member and is configured so that the large diameter section is not to be flexed when the fastening pin is driven into the rigid member. Accordingly, the strength of the taper portion is increased and stress concentration on the large diameter section is alleviated and a bending strength of the large diameter section is improved. Further, if a region over ⅓ of the axial length of the fastening pin from the enlarged head part side is retained not to be flexed when being driven into the rigid member, a driving energy is concentrated on a leading end of the enlarged head part. In addition, since the penetration resistance is maintained in a lower level, it is possible to securely drive the fastening pin into the rigid member. Also, since the pullout resistance after being driven is effectively maintained, it is possible to cause the fastening time to be longer.

In the above structure, a taper angle θ1 of the taper portion 5 may be within a range from 2 to 5 degree.

According to this structure, the taper portion formed between the round portion and the middle shaft section is tapered at 2 to 5 degree. Accordingly, it is possible to reduce the penetration resistance for the rigid member to be driven, to minimize the power required for a driving operation and to desirably keep a pullout resistance after the fastening pin is driven into the rigid member. Further, since the strength of the large diameter section is significantly increased, a stress concentration on the large diameter section is alleviated when the fastening pin is driven into the rigid member and thus a bending strength of the large diameter section is improved.

In the above structure, a curvature of the round portion 4 may be set so large that an under-head portion directly below the enlarged head part 1 is not to be flexed when the fastening pin is driven into the rigid member.

According to this structure, the round portion is set so large that the under-head portion is not to be flexed when the fastening pin is driven into the rigid member. Accordingly, a stress concentration on the enlarge diameter head part is alleviated and thus a bending strength of the enlarge diameter head part is improved. As a result, it is possible to securely drive the fastening pin into the rigid member to be driven.

In the above structure, the small diameter section 2c may include a lower middle shaft portion 6 having a uniform diameter which is smaller than a diameter of the middle shaft section 2b, a lower taper portion 7 provided between the lower middle shaft portion 6 and the middle shaft section 2b, and a leading end portion 8 provided below the lower middle shaft portion 6 and formed in the bullet shape.

According to this structure, the small diameter section includes a lower middle shaft portion having uniform diameter smaller than that of the middle shaft section, a taper portion provided between the lower middle shaft portion and the middle shaft section, and a leading end portion provided below the lower middle shaft portion and formed in a bullet shape. Accordingly, a penetration resistance of the leading end portion is reduced. Further, since the lower middle shaft portion has uniform diameter, the penetration resistance thereof is reduced and the pullout resistance is improved. In addition, since a diameter of the lower taper portion provided between the lower middle shaft portion and the middle shaft section is gradually increased, it is possible to increase the strength of a region from an upper portion of the pin to the middle shaft section.

Further, in the above structure, a lower end of the lower taper portion 7 may be in contact with an upper end of the lower middle shaft portion 6, and the lower end of the lower taper portion 7 may have the same diameter with a diameter of the upper end of the lower middle shaft portion 6. A lower end of the lower middle shaft portion 6 may be in contact with an upper end of the leading end portion 8, and the lower end of the lower middle shaft portion 6 may have the same diameter with a diameter of the upper end of the leading end portion 8.

In addition, the round portion 4 may have the largest diameter within the shaft part 2.

Moreover, in accordance with the above embodiments, a method of manufacturing a fastening pin A may include: a step of providing a pair of dies 12, 12 and a header punch 13 which is movable in a vertical direction above the dies 12, 12; a step of providing an upper space 14 and a lower space 15 in continuous manner between matching surfaces of the pair of dies 12, 12, the upper space 14 including a taper portion 5a which has an inner diameter larger than an outer diameter of a rod member 21 used as a material of the fastening pin A, the lower space 15 having an inner diameter substantially equal to the outer diameter of the rod member 21 and a bottom of the lower space 15 being closed; a step of arranging the rod member 21 in the upper space 14 and the lower space 15 in a state that an upper part of the rod member 21 is projected upward from the matching surfaces of the pair of dies 12, 12; a step of mating the pair of dies 12, 12 to each other to fix the rod member 21 therein; and a step of forming the taper portion 5 of the fastening pin A by urging and crushing the upper part of the rod member 21 by the header punch 13 to cause the upper part of the rod member 21 to be projected outward.

According to this method, the taper portion of the fastening pin is formed by providing an upper space and a lower space in continuous manner between matching surfaces of the pair of dies, the upper space including a taper portion which has an inner diameter larger than an outer diameter of a rod member used as a material of the fastening pin, the lower space having an inner diameter substantially equal to the outer diameter of the rod member and a bottom of the lower space being closed; providing the rod member in the upper space and the lower space in a state where an upper part of the rod member is projected upward from the matching surface of the dies; mating the dies to each other to fix the rod member and urging and crushing an upper end of the rod member using the header punch to cause the upper end to be projected outward, thereby filling the taper portion of the upper space of the dies. Accordingly, the taper portion having a diameter larger than the diameter of the rod member can be rapidly and economically formed in the fastening pin without a specific processing.

What is claimed is:

1. A fastening pin to be driven into a rigid member, the fastening pin comprising:
   an enlarged head part; and
   a shaft part,
   wherein the shaft part includes:
      a large diameter section formed below the enlarged head part;
      a middle shaft section formed below the large diameter section; and
      a small diameter section extending from the middle shaft section to a leading end of the fastening pin, wherein the large diameter section includes a round portion formed below the enlarged head part and a taper portion formed between the round portion and the middle shaft section, and a diameter of the large diameter section at a side of the enlarged head part is larger than a diameter of the large diameter section at a side of the middle shaft section, wherein the middle shaft section has a uniform diameter from a side of the large diameter section to a side of the small diameter section, wherein a side of a leading end of the small diameter section has a bullet shape, and wherein the small diameter section includes:
- a lower middle shaft portion having a uniform diameter which is smaller than a diameter of the middle shaft section;
- a lower taper portion provided between the lower middle shaft portion and the middle shaft section; and
- a leading end portion provided below the lower middle shaft portion and formed in the bullet shape.

2. The fastening pin according to claim 1, wherein a lower end of the large diameter section is in contact with an upper end of the middle shaft portion, and the lower end of the large diameter section has the same diameter with a diameter of the upper end of the middle shaft portion, wherein a lower end of the middle shaft section is in contact with an upper end of the small diameter section, and the lower end of the middle shaft section has the same diameter with a diameter of the upper end of the small diameter section, and wherein a lower end of the round portion is in contact with an upper end of the taper portion, and the lower end of the round portion has the same diameter with a diameter of the upper end of the taper portion.

3. The fastening pin according to claim 1, wherein a length is of the large diameter section is the same as or greater than ⅓ of an axial length of the shaft part, wherein a taper angle of the taper portion is set to an extent so as to reduce a penetration resistance against the rigid member and to keep a pullout resistance after the fastening pin is driven into the rigid member and such that the large diameter section is not to be flexed when the fastening pin is driven into the rigid member.

4. The fastening pin according to claim 1, wherein a taper angle of the taper portion is within a range from 2 to 5 degree.

5. The fastening pin according to claim 1, wherein a curvature of the round portion is set so large that an under-head portion directly below the enlarged head part is not to be flexed when the fastening pin is driven into the rigid member.

6. The fastening pin according to claim 1, wherein a lower end of the lower taper portion is in contact with an upper end of the lower middle shaft portion, and the lower end of the lower taper portion has the same diameter with a diameter of the upper end of the lower middle shaft portion, wherein a lower end of the lower middle shaft portion is in contact with an upper end of the leading end portion, and the lower end of the lower middle shaft portion has the same diameter with a diameter of the upper end of the leading end portion.

7. The fastening pin according to claim 1, wherein the round portion has the largest diameter within the shaft part.

* * * * *